US009031080B2

(12) United States Patent
Hafeez

(10) Patent No.: US 9,031,080 B2
(45) Date of Patent: May 12, 2015

(54) RATE ALLOCATION SCHEME FOR COORDINATED MULTIPOINT TRANSMISSION

(75) Inventor: Abdulrauf Hafeez, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 348 days.

(21) Appl. No.: 12/645,814

(22) Filed: Dec. 23, 2009

(65) Prior Publication Data

US 2011/0149877 A1 Jun. 23, 2011

(51) Int. Cl.
| | |
|---|---|
| H04L 12/28 | (2006.01) |
| H04L 12/56 | (2006.01) |
| H04W 4/00 | (2009.01) |
| H04B 7/04 | (2006.01) |
| H04B 7/02 | (2006.01) |
| H04B 7/06 | (2006.01) |
| H04W 72/08 | (2009.01) |

(52) U.S. Cl.
CPC ............. *H04B 7/0452* (2013.01); *H04B 7/024* (2013.01); *H04B 7/0617* (2013.01); *H04W 72/082* (2013.01)

(58) Field of Classification Search
CPC .. H04B 7/0617; H04B 7/0639; H04B 7/0626; H04B 7/0632; H04B 7/0663; H04B 7/0634; H04L 25/0242
USPC .......... 370/229, 329, 333, 395.4, 395.42, 444
See application file for complete search history.

(56) References Cited

U.S. PATENT DOCUMENTS

| | | | | |
|---|---|---|---|---|
| 6,590,890 | B1 * | 7/2003 | Stolyar et al. ................. | 370/349 |
| 2007/0116138 | A1 * | 5/2007 | Tsai et al. ..................... | 375/260 |

(Continued)

FOREIGN PATENT DOCUMENTS

| | | |
|---|---|---|
| CN | 101291526 A | 10/2008 |
| CN | 101569116 A | 10/2009 |

(Continued)

OTHER PUBLICATIONS

Sean A Ramprashad et al: "Cellular vs. Network MIMO: A comparison including the channel state information overhead", IEEE 20th International Symposium on Personal, Indoor and Mobile Radio Communications (PIMRC 2009), IEEE, Piscataway, NJ, USA, Sep. 13, 2009.

(Continued)

*Primary Examiner* — Hoang-Chuong Vu

(57) ABSTRACT

In a communication system transmitting from multiple antennas to multiple users, data transmission rates are allocated over scheduled users by varying the weights assigned to the users. The user weights determine the transmission precoding vectors used for the transmissions, which determine the data rates. In one embodiment, a set of predetermined weights is selected from a plurality of sets of weights as the one maximizing the sum, over all scheduled users, of the ratio of each user's instantaneous data rate to the average rate over prior frames. In another embodiment, the weights, precoding vectors, and data rates are frequency-specific. In another embodiment, the user weights are determined through an iterative process of assigning initial weights, determining the precoding vectors associated with the weights, determining the channel conditions for transmission using the determined precoding vectors, and adjusting the user weights based on their relative channel conditions.

10 Claims, 3 Drawing Sheets

(56) References Cited

U.S. PATENT DOCUMENTS

| | | | |
|---|---|---|---|
| 2007/0218950 | A1 | 9/2007 | Codreanu et al. |
| 2008/0153428 | A1* | 6/2008 | Han et al. ............... 455/69 |
| 2008/0159122 | A1* | 7/2008 | Dor ..................... 370/208 |
| 2009/0069054 | A1* | 3/2009 | Zangi et al. ............ 455/562.1 |
| 2009/0239565 | A1* | 9/2009 | Han et al. ............... 455/512 |
| 2009/0253380 | A1 | 10/2009 | Ko et al. |
| 2009/0279486 | A1* | 11/2009 | Kishigami et al. ......... 370/329 |
| 2009/0296650 | A1 | 12/2009 | Venturino |
| 2010/0056140 | A1 | 3/2010 | Hafeez et al. |
| 2010/0111211 | A1* | 5/2010 | Han et al. ............... 375/260 |
| 2010/0195594 | A1* | 8/2010 | Seo et al. ............... 370/329 |
| 2010/0284359 | A1* | 11/2010 | Kim et al. .............. 370/329 |
| 2010/0322331 | A1* | 12/2010 | Sun et al. ............... 375/260 |
| 2011/0059705 | A1* | 3/2011 | Tajer et al. .............. 455/114.3 |
| 2011/0075752 | A1* | 3/2011 | Zheng et al. ............. 375/267 |
| 2011/0086654 | A1* | 4/2011 | Larsson ................. 455/501 |
| 2011/0110444 | A1* | 5/2011 | Roh et al. ............... 375/260 |
| 2012/0051450 | A1* | 3/2012 | Zangi ................... 375/285 |
| 2012/0170676 | A1* | 7/2012 | Tajer et al. .............. 375/267 |
| 2012/0225625 | A1* | 9/2012 | Asplund et al. ........... 455/77 |

FOREIGN PATENT DOCUMENTS

| | | |
|---|---|---|
| EP | 1 508 992 A2 | 2/2005 |
| EP | 1 863 248 A1 | 12/2007 |
| WO | WO 2008/082848 A1 | 7/2008 |

OTHER PUBLICATIONS

Motorola: IISCF-based Coordinated Beamforming and Performance Gain over Single-Point SU/MU Beamforming II, 3GPP Draft; RI-094848 SCF Based COBF and Results—Final, 3rd Generation Partnership Project (3GPP), Mobile Competence Centre; 650, Route Des Lucioles ; F-06921 Sophia-Antipolis Cedex ; France, no. Jeju; Nov. 9, 2009, XP050389236.

Schubert M., et al. "Solution of the Multiuser Downlink Beamforming Problem with Individual SINR Constraints" IEEE Trans. VT, vol. 53, No. 1, Jan. 2004, the whole document.

Foschini,G.J., et al. "Coordinating Multiple Antenna Cellular Networks to Achieve Enormous Spectral Efficiency," *IEE Proc.-Commun.*, vol. 153, issue 4, Aug. 2006, pp. 548-555.

"Coordinated Multipoint Transmission / Reception," TSG-RAN WG1 #53bis, R1-082469, Warsaw Poland, Jun. 30, 2008, the whole document.

"Physical Layer Aspects for Evolved Universal Terrestrial Radio Access (UTRA)," 3GPP TR 25.814, V7.1.0, Sep. 2006-2009, the whole document.

* cited by examiner

RATE ALLOCATION SCHEME FOR COORDINATED MULTIPOINT TRANSMISSION

BACKGROUND

Wireless cellular communication networks are nearly ubiquitous, and provide mobile voice and data communications to millions of subscribers. In a cellular network, a fixed transceiver, or Access Point (AP), provides two-way radio communications with a plurality of subscribers within a geographic area, or cell. In modern wireless cellular communication networks, inter-cell interference, or interference at User Equipment (UE) from non-serving APs, remains the dominant source of performance impairment, restricting data rates, system capacity, and the quality of delivered communication services. Similar interference occurs when transmitting from multiple antennas at a single AP to multiple UEs.

A system of joint adaptive beamforming from a multi-antenna AP to multiple UEs is disclosed in the paper by M. Schubert and H. Boche titled, "Solution of the multiuser beamforming problem with individual SINR constraints," published in the *IEEE Trans. VT*, vol. 53, no. 1, January 2004, the disclosure of which is incorporated herein by reference in its entirety. According to this system, the beamformers and transmission powers are jointly adjusted to fulfill individual average Signal-to-Interference-plus-Noise Ratio (SINR) requirements at the UEs. An algorithm is derived that maximizes the jointly-achievable SINR margin (over the SINR requirements) under sum transmit power constraint.

Coordinated Multi-Point (CoMP) transmission is a system architecture to minimize interference between multiple APs. CoMP differs from a conventional cellular architecture in that antennas at various APs in a geographical location are connected to a central CoMP controller by means of a fast backhaul. The CoMP controller minimizes interference by coordinating scheduling of transmissions to user equipment (UE) within the cells, and/or actively suppressing interference using signal processing techniques. In CoMP signal processing, transmissions to each UE, from each transmitting antenna, are weighted to minimize interference and maximize throughput. This coordinated transmission from multiple APs in the downlink allows CoMP systems to achieve very high spectral efficiencies, compared to conventional cellular networks. CoMP systems are disclosed in the paper by G. J. Foschini, K. Karakayali, and R. A. Valenzuela, titled "Coordinating multiple antenna cellular networks to achieve enormous spectral efficiency," published in the *IEE Proc.-Commun.*, vol. 153, issue 4, pp. 548-555, August 2006, and in the 3GPPP specification "Coordinated multipoint transmission/reception," TSG-RAN WG1 #53bis, R1-082469, Warsaw Poland, Jun. 30, 2008, disclosure of both of which is incorporated herein by reference in their entireties.

A system of joint adaptive beamforming from multiple APs in a CoMP cell is disclosed in U.S. Provisional Patent Application Ser. No. 61/094,108 by A. Hafeez, filed September 2008, titled "Multiuser beamforming under per transmitter power constraints," the disclosure of which is incorporated herein by reference in its entirety. An algorithm is derived that maximizes the jointly-achievable SINR margin for the UEs in a CoMP cell under per-transmitter (i.e., AP) power constraints.

The multiuser beamforming schemes disclosed by Schubert, et al. and Hafeez maximize the jointly-achievable SINR margin over the individual SINR targets for the UEs. These approaches, however, do not address the problem of setting the individual SINR targets for the UEs. Practical considerations, such as UE quality of service (QoS) requirements and traffic conditions come into play in determining these targets. Moreover, system aspects, such as fairness and throughput optimization must also be considered.

Multiuser beamforming with equal UE SINR targets does not guarantee equal bit rates for the UEs. This is because with equal UE SINR targets, the multiuser beamforming algorithms equalize the average SINRs for the UEs scheduled in the given frame, without regard to the bit rates achieved by the UEs in past frames. In other words, scheduling, which is done independently of the beamforming scheme, affects the average UE bit rates.

Setting equal UE bit rate targets is generally not good for system throughput as UEs with favorable channel conditions are penalized, while UEs with unfavorable channel conditions are rewarded. On the other hand, setting UE bit rate targets based on their channel conditions alone (e.g., SINR) may result in gross unfairness among UEs. For example, UEs in poor channel conditions will receive only a low bit rate for extended periods. Similarly, providing high bit rates to UEs in good channel conditions improves system throughput, but is unfair over the long term.

SUMMARY

According to embodiments disclosed and claimed herein, data transmission rates are allocated over scheduled users by varying the weights assigned to the users. The user weights determine the transmission precoding vectors used for the transmissions, which determine the data rates. In one embodiment, a set of predetermined weights is selected from a plurality of sets of weights as the one maximizing the sum, over all scheduled users, of the ratio of each user's instantaneous data rate to the average rate over prior frames. In another embodiment, the weights, precoding vectors, and data rates are frequency-specific. In another embodiment, the user weights are determined through an iterative process of assigning initial weights, determining the precoding vectors associated with the weights, determining the channel conditions for transmission using the determined precoding vectors, and adjusting the user weights based on their relative channel conditions.

DETAILED DESCRIPTION

Figure 1:
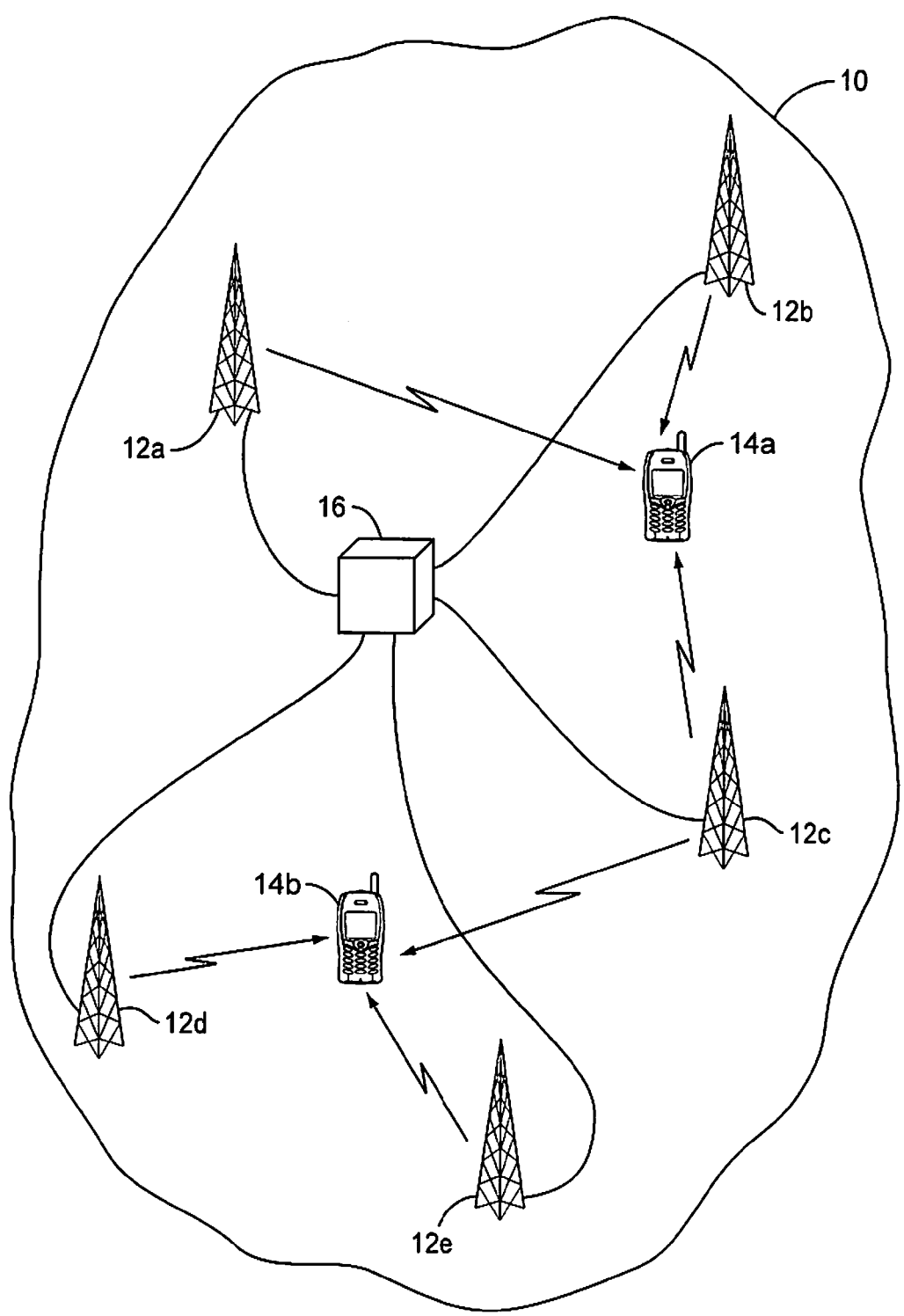
FIG. 1 is a functional block diagram of a CoMP wireless communication network.

FIG. 1 depicts a CoMP wireless communication network 10. The network 10 includes a plurality of AP antennas 12a-12e. Although depicted as a single antenna 12 per AP tower, in other embodiments, an AP may have multiple co-located antennas 12. The AP antennas 12 transmit communication signals on the downlink to a plurality of UEs 14a-14b. The AP antennas 12 are all connected to a central CoMP controller 16, which coordinates both scheduling and transmission parameters among the AP antennas 12 to control interference at the UEs 14. As depicted in FIG. 1, the CoMP controller 16 coordinates the transmissions from AP antennas 12a, 12b, and 12c to UE 14a, weighting the transmissions, for example to maximize the SINR at UE 14a. Similarly, the CoMP controller 16 coordinates the transmissions from AP antennas 12c, 12d, and 12e to UE 14b. Of course, the CoMP controller 16 can be considered to control transmissions from all CoMP antennas 12 to each UE 14, although in practical implementations, many of these transmission paths will be given weights of zero, effectively eliminating them.

Downlink multiuser transmission schemes in CoMP networks 10 are generally designed to maximize either the sum user throughput (bit rate) or the minimum user throughput. To give different users different priorities, user throughputs may be weighted. Moreover, other metrics may be used instead of throughput, such as the SINR or the mean square error (MSE).

Let there be J sets of weights for the users scheduled for transmission in a current frame (i.e., a predetermined temporal duration). Assume that the weight sets are fixed and predetermined. Let $\underline{\mu}(j) = [\mu_1(j)\ \mu_2(j) \ldots \mu_K(j)]$ be the j-th weight set for users 1, 2, ... K scheduled for downlink transmissions in the current frame. Let V(j) be the transmission precoding vectors specifying transmit antenna coefficients according to a multiuser transmission scheme corresponding to the j-th weight set. Let $\underline{r}(j)$ be the user rates in the current frame if the precoding vectors v(j) were used for transmission. Let $\underline{r}_{avg}(j)$ be estimates of the average rates for the same users in recent past frames. The average user rates may be obtained by filtering or smoothing the instantaneous (per frame) user rates, e.g., over two or more prior frames.

According to one embodiment, the weight set $j_0$ is selected as $$j_0 = \operatorname*{argmax}_j \sum_{k=1}^{K} \frac{r_k(j)}{r_{k,avg}(j)} \quad (1)$$

and the corresponding set of precoding vectors $V(j_0)$ is selected and used for transmission.

In a coherent multiuser transmission scheme, the transmission precoding vectors V(j,f) are frequency-specific (or specific to a frequency band). In this case, the user weights $\underline{\mu}(j,f)$ are also frequency-specific. Let $\underline{r}(j,f)$ be the user rates for frequency f in the current frame if the precoding vectors V(j,f) were used for transmission. Let $\underline{r}_{avg}(j,f)$ be estimates of the average rates for frequency f for the same users in recent past frames.

According to another embodiment, the weight set $j_0$ (f) is selected for frequency f as $$j_0(f) = \operatorname*{argmax}_j \sum_{k=1}^{K} \frac{r_k(j,f)}{r_{k,avg}(j,f)} \quad (2)$$

and the corresponding set of precoding vectors $V(j_0(f),f)$ is selected and used for transmission.

Figure 2:
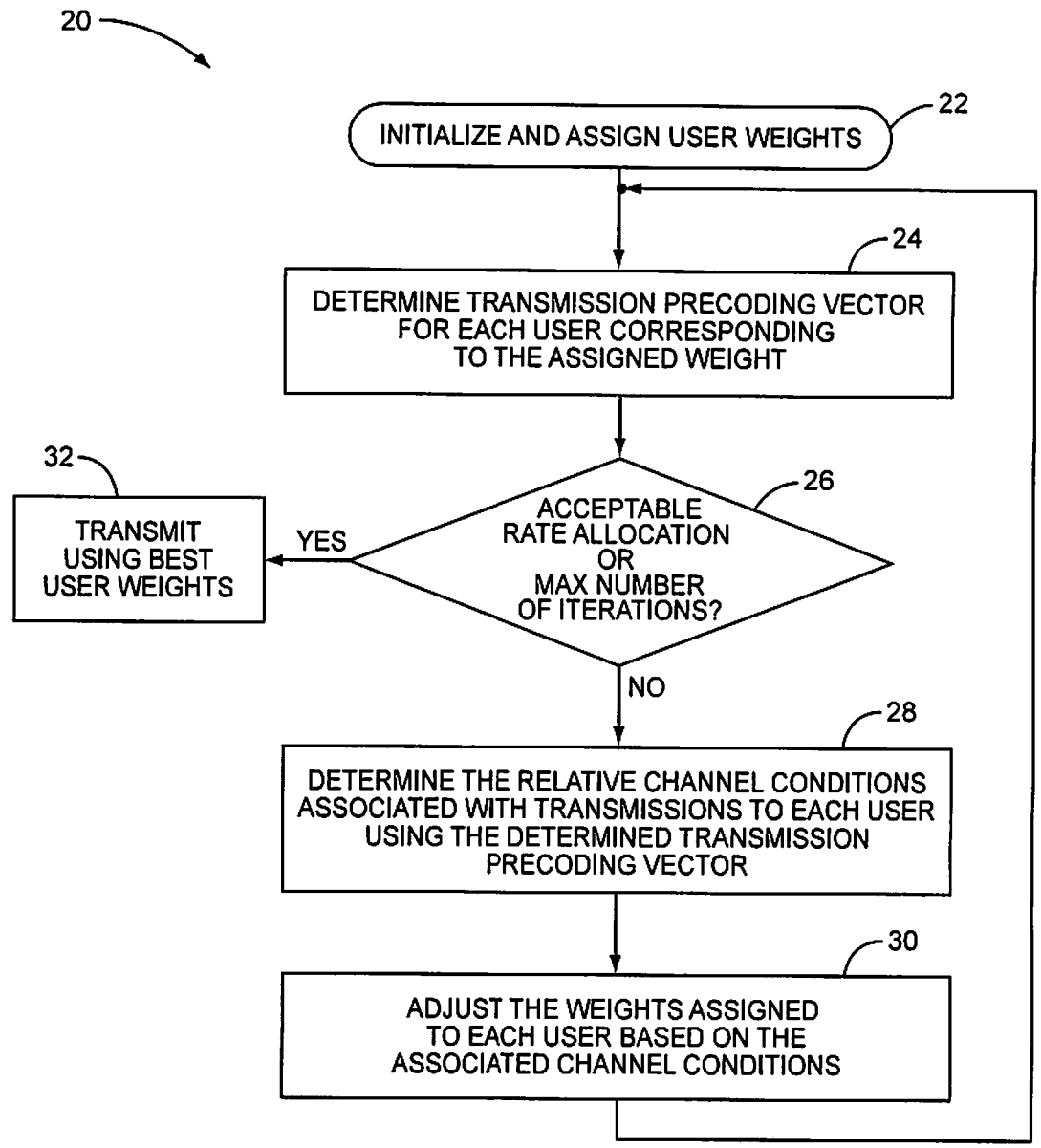
FIG. 2 is a flow diagram of a method of allocating data rates among multiple users from multiple antennas in a CoMP network.

In another embodiment, user weights are determined according to user channel conditions. Note that user channel conditions are coupled to each other in a multiuser channel. Therefore, we use an iterative method 20, depicted in FIG. 2. An initial set of weights is selected and assigned to users (block 22). In one embodiment, the initial weights are equal among all users. The transmission precoding vectors corresponding to the assigned (i.e., initial) user weights are determined (block 24). For the first iteration, the decision block 26 is traversed, and the relative channel conditions associated with transmission to the users, using the selected transmission precoding vectors, are determined (block 28). The channel conditions may be indicated by metrics such as achieved data rates, SINRs, MSEs, etc. The user weights are adjusted based on the relative channel conditions (block 30). For example, weights may be raised for users in favorable channel condition, weights may be lowered for users in unfavorable channel conditions, or both. In comparing users' channel conditions, the channel condition metrics associated with a user may be compared to predetermined threshold values. Alternatively, since it is the relative channel conditions among the users that is important, a user's channel condition metrics may be compared to channel condition metrics associated with other users. The transmission precoding vectors corresponding to the new weights are determined (block 24). If a predetermined number of iterations have been performed, or if a metric, such as the sum of weighted user throughputs, exceeds a predetermined threshold (block 26), then data is transmitted to the scheduled users during the current frame using the best weights, where the best weights are the weights that obtain the highest weighted sum user throughput. Alternatively, the method 100 iterates again (blocks 28, 30, 24).

System-level simulations were conducted to quantify the benefits of embodiments of the invention. A macro-cellular urban environment corresponding to 3GPP Case 1 was considered. See 3GPP TR 25.814, "Physical layer aspects for evolved Universal Terrestrial Radio Access (UTRA)," V7.1.0, September 2006, the disclosure of which is incorporated herein by reference in its entirety. A network of three CoMP cells comprising nine subcells (120 degree sectors) was simulated. The inter-site distance was 500 m. Full-buffer traffic and 3 km/hr UE speed was assumed. In the simulation, UEs were equipped with one antenna while APs were equipped with four-element antenna arrays with an inter-element spacing of 0.5λ. Round robin UE scheduling based on a fixed grid of (four) beams was assumed. Practical modulation/coding and link adaptation was used. Carrier frequency was 2 GHz and channel bandwidth was 9 MHz.

The multiuser transmission scheme simulated is multiuser beamforming (per the Hafeez provisional patent application cited above), which jointly adapts the beamforming weights and transmit powers for the scheduled users in a CoMP cell to maximize the jointly-achievable average UE SINR margin, where the average is taken over all frequencies. The SINR margin is defined as the ratio of the average SINR to the SINR target for each UE. The jointly-achievable SINR margin is the SINR margin that can be achieved by all UEs. The method 20 of FIG. 2 was simulated, where the initial UE SINR targets (user weights) are set to be equal (to a nominal value). After each iteration (j) of the multiuser beamforming algorithm, the SINR targets are adapted as $$\mu_k(j+1) = \mu_k(j) \frac{P_{max}}{p_k(j)}$$

where $P_k(j)$ is the transmit power for the AP serving UE k in iteration j and $P_{max}$ is the maximum transmit power allowed for the AP. Four iterations are used and the best user weight set and the corresponding transmission precoding vectors are found according to equation (1), where the k-th user rate is computed as $$r_k(j) = \log_2(1 + \mu_k(j) * C_k(j))$$

where $C_k(j)$ is the optimum jointly-achievable SINR margin.

Figure 3:
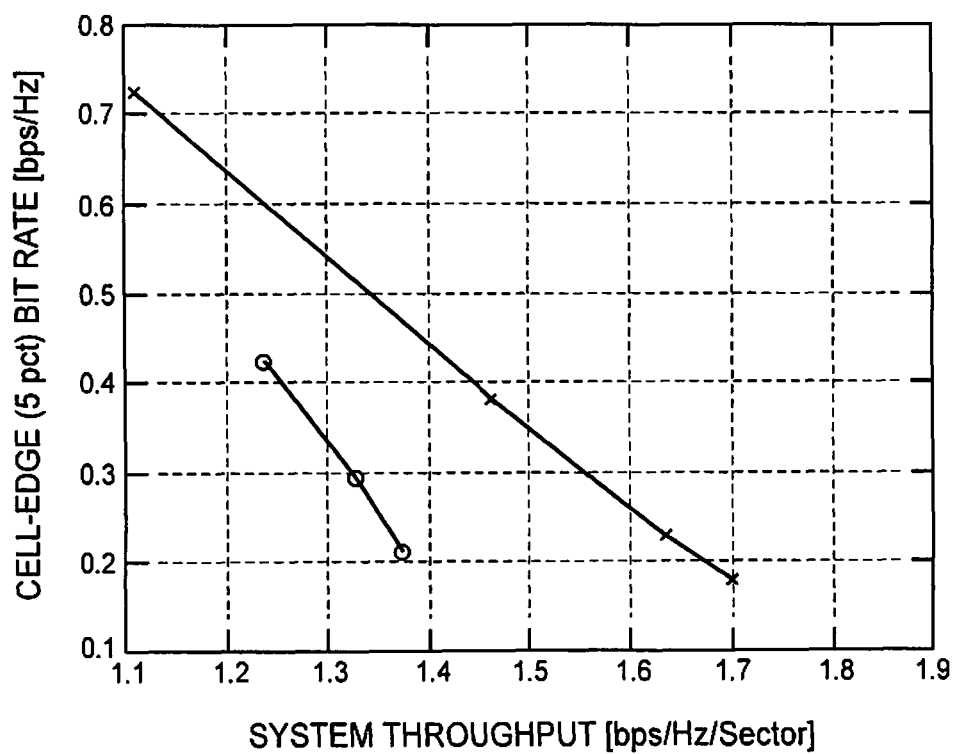
FIG. 3 is a graph depicting the results of simulation of a CoMP network.

FIG. 3 depicts the system throughput versus the cell-edge (5 percentile) user throughput for multiuser beamforming with and without rate allocation.

The present invention may, of course, be carried out in other ways than those specifically set forth herein without departing from essential characteristics of the invention. Furthermore, although the invention has been described with reference to several exemplary embodiments, it is understood that the words that have been used are words of description and illustration, rather than words of limitation. The embodiments described herein are to be considered in all respects as illustrative and not restrictive, and all changes coming within the meaning and equivalency range of the appended claims are intended to be embraced therein.

What is claimed is:

1. An iterative method of allocating data transmission rates to multiple users from multiple antennas in a wireless communication network, comprising:
    initially assigning a weight to each user, the weight indicating the user's relative priority;
    determining a transmission precoding vector for each user, corresponding to the assigned weight;
    determining relative channel conditions associated with transmissions to each user using the determined transmission precoding vector;
    adjusting the weight assigned to each user based on the associated channel conditions; and
    determining a transmission precoding vector for each user, corresponding to the adjusted weight.

2. The method of claim 1 wherein the initial weight assignment is equal weights to all users.

3. The method of claim 1 further comprising iterating, one or more times, the steps of:
    determining the relative channel conditions associated with transmissions to each user using the determined transmission precoding vector;
    adjusting the weight assigned to each user based on the associated channel conditions; and
    determining a transmission precoding vector for each user, corresponding to the adjusted weight.

4. The method of claim 3 wherein iterating one or more times comprises iterating a predetermined number of times.

5. The method of claim 3 wherein iterating one or more times comprises iterating until a predetermined metric meets a predetermined threshold.

6. The method of claim 1 wherein adjusting the weight assigned to each user based on the associated channel conditions comprises increasing the weights assigned to users associated with high channel conditions compared to other users' channel conditions.

7. The method of claim 1 wherein adjusting the weight assigned to each user based on the associated channel conditions comprises decreasing the weights assigned to users associated with low channel conditions compared to other users' channel conditions.

8. The method of claim 1 further comprising transmitting data to the users, using the latest determined transmission precoding vectors.

9. A method of allocating data transmission rates to multiple users from multiple antennas in a wireless communication network, comprising:
    providing a plurality of sets of weights for the users scheduled for transmission in a predetermined period, each weight set indicating the users' relative priority and being associated with a corresponding set of transmission precoding vectors yielding a corresponding set of user data transmission rates;
    selecting the set of weights yielding the maximum summation, over the scheduled users, of the ratio of each user's data transmission rate in the current transmission period to that user's average data transmission rate over at least the past two transmission periods; and
    transmitting data to the users, using the transmission precoding vectors associated with the selected set of weights.

10. The method of claim 9 wherein the weights, precoding vectors, and data rates are frequency-specific.

* * * * *